United States Patent [19]

Kotick et al.

[11] Patent Number: 4,932,880
[45] Date of Patent: Jun. 12, 1990

[54] LOW-COST SOUND RELATED TRAINER

[75] Inventors: David M. Kotick; Jonathan M. Smith, both of Orlando, Fla.

[73] Assignee: The United States of America as represented by the Secretary of the Navy, Washington, D.C.

[21] Appl. No.: 335,650

[22] Filed: Apr. 7, 1989

[51] Int. Cl.⁵ ............................................. G11B 27/00
[52] U.S. Cl. ................................. 434/319; 434/308; 434/366; 128/715; 360/32
[58] Field of Search ................................ 434/35-38, 434/319, 48, 69, 308, 365, 366, 309; 128/672, 687, 695, 715; 360/32

[56] References Cited

U.S. PATENT DOCUMENTS

| | | | |
|---|---|---|---|
| 3,483,634 | 12/1969 | Staples et al. | 434/48 |
| 3,718,987 | 3/1973 | Carver | 434/48 |
| 3,911,494 | 10/1975 | Wilson et al. | 434/319 X |
| 4,196,528 | 4/1980 | Foerst | 434/69 X |
| 4,301,809 | 11/1981 | Pinchak | 128/695 |
| 4,490,810 | 12/1984 | Hon . | |
| 4,528,689 | 7/1985 | Katz | 360/32 X |
| 4,590,524 | 5/1986 | Okamoto et al. | 360/32 X |
| 4,729,737 | 3/1988 | Reagan et al. | 434/35 |
| 4,736,322 | 4/1988 | Clifford | 128/695 X |
| 4,749,354 | 6/1988 | Kerman . | |
| 4,763,207 | 8/1988 | Podolak et al. | 360/32 |
| 4,781,594 | 11/1988 | Metcalf . | |
| 4,853,797 | 8/1989 | Yamada et al. | 360/32 |

*Primary Examiner*—Richard J. Apley
*Assistant Examiner*—J. L. Doyle
*Attorney, Agent, or Firm*—Robert W. Adams

[57] ABSTRACT

An interactive and programmable tone generator with scenarios is disclosed and described as a training device. Sounds are recorded as they are heard in their actual environment. The recording then can be combined with a coded track that triggers a graphics demonstration previously prepared from notations taken during the recordings that describe the actual environment that corresponds to the respective sound. Also, selections can be taken from the recording that present a best example of a sound to be learned, looped for repetition, and then rerecorded digitally onto micro-floppy diskettes. When played-back the diskettes provide challenging interactive training for the novice and expert alike in a variety of available modes using both computer generated graphics and sounds reconverted from digital storage.

9 Claims, 2 Drawing Sheets

LOW-COST SOUND RELATED TRAINER

BACKGROUND OF THE INVENTION

The invention relates to the field of training devices and, more specifically, to the training of individuals in their recognition of various sounds. The embodiment that will be described in detail is for the training of users of a hand-held sonar device.

The sonar device makes very distinct sounds when operated in its intended underwater environment, sounds that have shades of variation and slightly discernible differences that are not easily shared by instructor and trainee underwater. Learning to recognize the sounds and distinguish them one from another is essential if the trainee is to use the device to locate and identify underwater objects without the benefit of visual contact. Even when the presence of an object is detected, the sounds that the diver will hear when he uses the sonar device and that the trainee needs to experience, depend on the range scale to the object, the diver's position within the range, and the object itself. It takes a well-trained ear to decipher the nuances in the repetitive "ping" that comes from the device in order to distinguish targets from other objects, classify a target as to type, and estimate its range.

Other sound related devices require the acute sensor perception of an astute listener to not only detect the differences in sometimes minimal variations of what they are hearing, but also to discern from perhaps a plurality of indicators, those that are significant from those that are not, and the meaning of each alone and in combination. Expertise is essential both for the identification step and the interpretation step. Such devices are found in the medical field where, for example, a stethoscope is used in the unintrusive examination of the heart and lungs, as well as during the taking of a patient's blood pressure. Additional devices in this and other fields in which the sense of hearing is involved to detect, discover, discern, distinguish or dicipher will be recognized by their users. For each, the present invention may be adapted.

The prior art of low-cost video graphics and pictorials in games and training devices is represented by the optical laser videodisc system of U.S. Pat. No. 4,490,810 to David C. Hon for Automated Instruction, Game and Data Retrieval System. Disclosed therein is an automated interactive system having an optical laser videodisc player unit. A videodisc record is used on which are recorded segmented groups of graphic and pictorial video information data interspersed with segmented groups of system control and programming data. Also, included is a television video display unit, a control processor and a user command/response unit having manual user input controls of variable functions. There are variable labelling means to indicate the current function as established by signals from the videodisc record. The processor receives short segments of programming data from the videodisc record and distributes information signals from the record to the other units in accordance with the program.

Sound simulators are represented by the compact disc system of U.S. Pat. No. 4,749,354 to Edward Kerman for Interactive Audio Teaching Aid, and by the processor controlled tone and noise generator system of U.S. Pat. No. 4,781,594 to Wilbur B. Metcalf for Sound Simulation System. The patent to Kerman discloses an interactive compact disc system that is adapted to have a teaching mode in addition to an entertainment mode, either is selectable by means of a mode switch. A predetermined aural response is recovered from predetermined randomly accessed storage on the digital disc, in response to the keystroke entered by the user. Each key is associated with a predetermined track location on the compact digitial disc. The keystroke generates a unique character code used by a microprocessor to address a track encoder read only memory that provides a look-up table for the memory location that contains a control code used to derive the signals required to select the chosen specific discrete audio segment from the compact digital disc. The patent to Metcalf discloses a composite sound generator wherein an assemblage of single tone generators and random noise generators are processor controlled to produce a realistic, multiple channel, audio environment. The assemblage includes frequency programmable tone generators, programmable tone attenuators and programmable random noise attenuators.

SUMMARY OF THE INVENTION

The present invention is a new approach of method and apparatus to sound related training that achieves authentic sounds at low cost. Sounds are recorded in the environment in which they are found, and then are coordinated with graphics that represent the activity that corresponds to the sounds. A purpose of the present invention is to provide a training device for sounds that in their environment normally do not occur enough to be reliably used for training, or that if they do occur enough, the environment in which they occur is not convenient for training.

A general purpose processor controls both the making and using of the training scenarios. A conventional audio tape recorder can be used to record the authentic sounds in the environment in which they occur. If the audio tape is dual track such as stereo tape, one track only is used to record the sounds and the second track is used later to receive encoded pulses that effectively index the sounds to graphics that will be prepared to represent the environment. If the audio tape on which the sounds are recorded is single track, the sounds need to be transferred to a dual track tape for indexing later by the processor. The graphics are written for the processor from notes about the operational environment that wree taken during the recording of the sounds. This mode is not interactive, and is better suited for demonstration purposes to acquaint a trainee to recognize the sounds that might be encountered when the operational equipment is used. Where the intended environment is one in which it would be difficult for the trainee and an instructor to communicate, the demonstration mode solves the communication problem by permitting the recorded sounds to be played back in a classroom, for example, and as a bonus, to be coupled with an appropriate scenario in computer graphics.

The interactive mode is prepared by converting the recorded sounds from their analog waveform to a digital counterpart that can be sampled into the memory of an electronic instrument that was designed for synthesized music. Prime examples of the stored waveforms are selected and looped with the aid of the processor to provide a continuous and repetitive source of the sound. In this mode, indexing means retrievably storing the loop in the instrument's memory. Also, the stored loops can be copied onto one or more diskettes for external storage and use later. When one of the diskettes later is loaded into the instrument, the sound loops that it contains again are indexed to identify their location. Of course, the loops may be stored on an internal hard disk, if one is available in the instrument.

The waveform loops that are indexed, are of the sounds that will be used in training. As with the demonstration mode, graphics are prepared for the processor's display that correspond to a scenario in which the sound can be expected to be encountered. However, unlike the demonstration mode, the training program may be flexible and interactive with the trainee since the digitized sound and graphics data is randomly accessible to the processor.

An objective of the present invention is to provide a low-cost, sound related training apparatus and method using available hardware components in a novel manner, and original application programs to prepare and control one or more training scenarios involving graphics and the reproduction of sounds recorded under operational conditions. It is another object of the invention to provide a training experience wherein the trainee can interact with the apparatus. And, it is an object to provide training that is menu driven so that it can be made suitable for all levels of skill, and easily operable by the trainee/student without instructor assistance.

Figure 2:
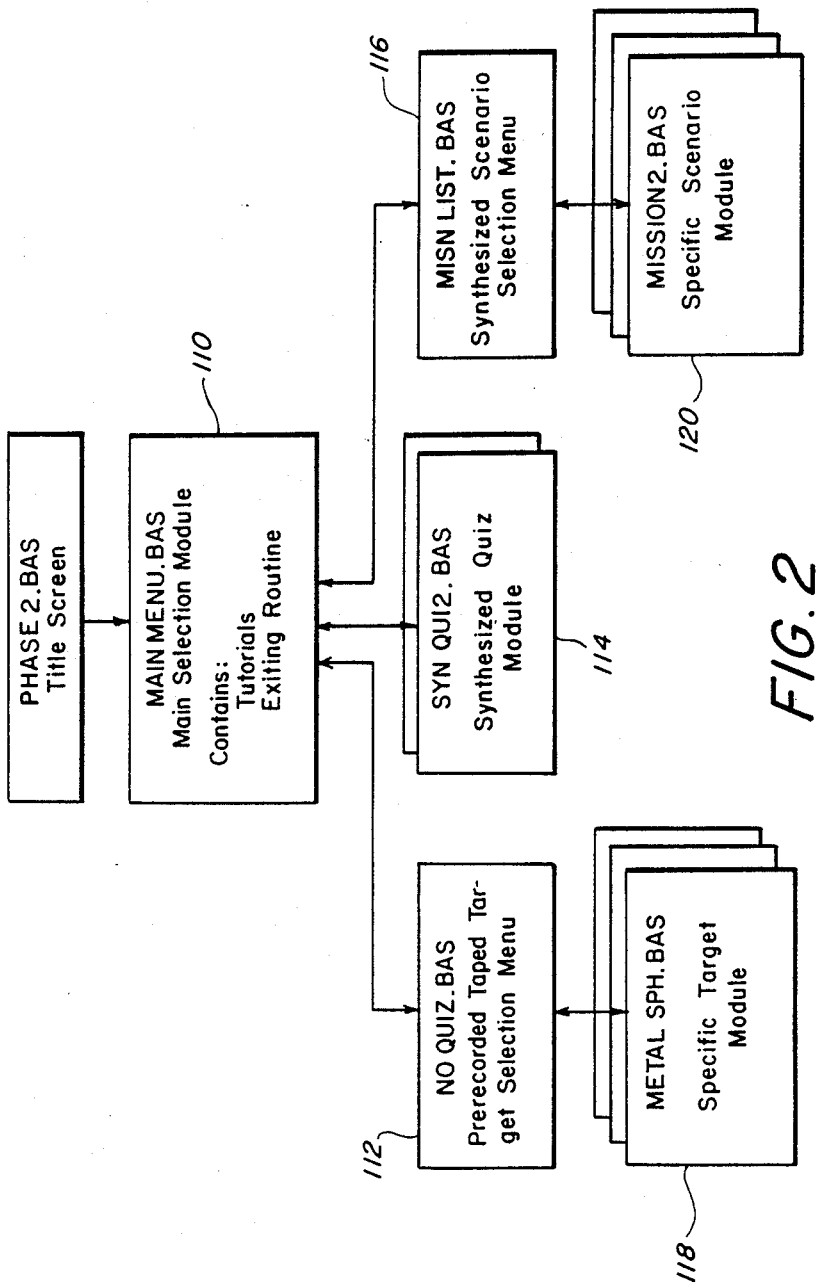
FIG. 2 is a block diagram of the structure of the software described in the preferred embodiment.

Annex A is a listing of a source code written in accordance with the software structure of FIG. 2.

DESCRIPTION OF A PREFERRED EMBODIMENT

The embodiment that will be described takes advantage of the technological advancements that have been made in the music field. Musical instruments and equipment now include synthesizers, digital keyboards and multisamplers. They are designed to create, modify, enhance and/or store synthesized sounds for playback under the control of the musician. Today, technology has merged with artistry to expand the horizons and test the creativity of the modern composer, and extend the versatility and challenge the skills of the arranger and interpretive musician.

Figure 1:
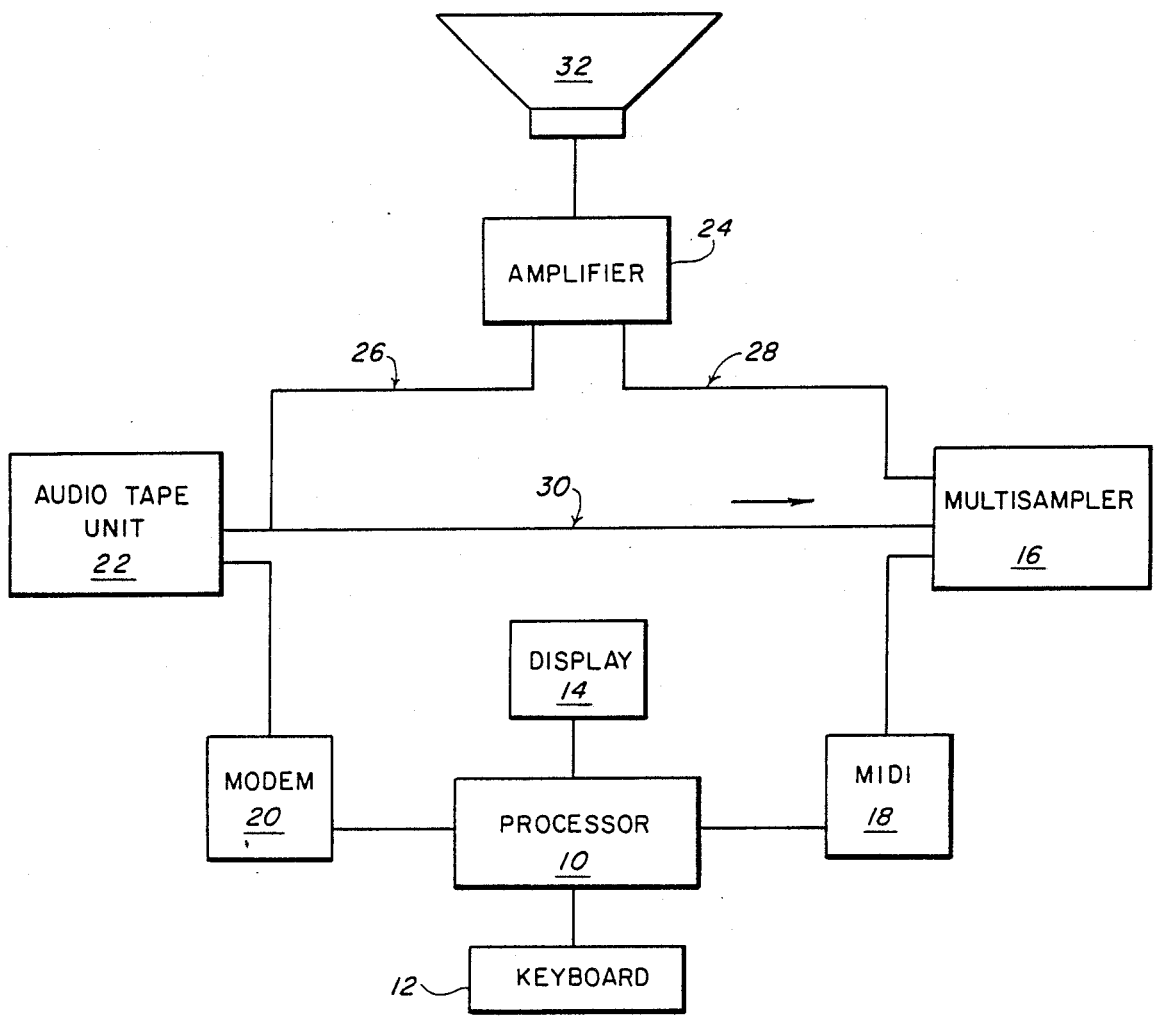
FIG. 1 is a block diagram of the hardware described in the preferred embodiment.

The invention is shown in FIG. 1 in an embodiment that includes general purpose microprocessor 10 with computer keyboard 12. The microprocessor coordinates and controls both the making of training scenarios for later use, and the using of previously prepared scenarios in both the demonstration mode and the interactive modes. Keyboard 12 and display 14 provide interface with the designer/assembler when the scenarios are being made, and with the trainee/student when the embodiment is being used. Multisampler 16 operates to digitize previously recorded sounds, and reconvert them for playback in accordance with a predetermined scenario under the control of processor 10. MIDI 18, or Musical Instrument Digital Interface 18, is included to establish the link between processor 10 and multisampler 16, which in the preferred embodiment is a piece of electronic musical equipment. The MIDI invokes a communication convention that is standard for the musical community, and is used herein in accordance with its established commercial purpose. Likewise, MODEM 20, or Modulator-Demodulator 20, establishes the communication link between processor 10 and audio tape unit 22. However, in the preferred embodiment, modem 20 is modified from its conventional commercial configuration. For example, its automatic disconnect feature is disabled in order to prevent disruption of the link that otherwise would occur when the modem detects no carrier signal, inasmuch as the modem only is required to communicate signals from processor 10 to unit 22 for indexing the audio tape, and then to communicate the encoded index signal back to processor 10 on playback. Modem 20 and MIDI 18 are available commercially as computer boards designed for internal installation in processor 10. Amplifier 24 is coupled in the demonstration mode to the audio signal provided by tape unit 22 over connection 26, and in the interactive modes to the audio signal provided by multisampler 16 over connection 28. Connection 30 communicates audio sounds from tape unit 22 to multisampler 16 such that the tape media on unit 22 operates not only as the source of the audio sounds that are used for the demonstration mode, but also as the source of the audio sounds that are used for the interactive modes. Connection 30 only is used to take the audio sounds from the tape during the making of the sound record in multisampler 16. Sound output is audibilized by speaker 32 and/or a headset, not shown.

The embodiment can be visualized as comprising two interrelated parts. The first is for sound, and the second is visual. The sound part starts with sounds as they are heard in their natural environment, whether that environment be underwater as with a hand-held sonar device, in a clinical setting as with a medical stethoscope and as with a mechanic's stethoscope for engine analysis, or in a production facility as with sound related quality control equipment. The sounds are recorded on audio tape. In addition, notes are taken about the event that describe salient characteristics for use later in generating the second part of the embodiment, i.e., the visual. For example, the scale setting on the sonar device, the compass setting to the sounds, the diver's movements, and the objects or targets that pertain to the sounds, are noteworthy for constructing the visual part of the embodiment. Then, the recorded sounds and notes are used to make the training sequences both for the demonstration mode, and for the interactive modes.

The demonstration mode is made by placing indexing signals on the adjacent track of the audio tape if a dual track tape was used during the recording step, or by transferring the recorded sounds to one track of an audio stereo tape and then indexing on the adjacent track. Indexing is to identify for processor 10 the sound that is being provided by tape unit 22 to amplifier 24, which is accomplished beforehand by uniquely identifying the tape along its length, and thereafter detecting each portion by its code as it is being played by the tape unit. Annex A of this disclosure contains a software module that is suitable to index a prerecorded tape that has been installed on unit 22. The software program is a sync track generator written in Basic computer language that communicates through modem 20 to unit 22 to encode a signal on the unused track of the tape media by operating the unit in its record mode. In the preferred embodiment, the encoded signal places a sequentially increasing number on the tape. Also, the software program of Annex A includes a sync track reader to decipher the encoded signal during playback. Of course, the encoded signal can be made to have any relationship to its intended counterpart on the other track, such as shifting from its related sound by lead time or lag time, as desired, without departing from the invention as long as the method of indexing provides a means by which processor 10 can correlate its graphics to the sounds(s). In addition, the recorded sounds may be selected, rearranged and re-recorded prior to indexing, as desired for the intended application, and need not be limited to the sequence that was originally recorded.

The interactive modes are made by sampling the sounds from the original tape into multisampler 16 over connection 30. Multisampler 16 converts the audio sounds from their analog form, to digital form for storage and processing. For example, the multisampler that was used in the model embodiment is a MIRAGE Digital Sampling Keyboard made by ENSONIQ Corporation. The keyboard is divided in half for sampling, with both the upper half and lower half each being available for a wavetable consisting of up to eight wavesamples. Each sample has its indexed location, with 256 samples per segment and 256 segments storable in 64K of memory. The multisampler is capable of sampling at up to 30K samples/second. By using an entire half of the keyboard for a single wavesample, approximately two seconds of continuous sound can be processed. It is recommended that the sample rate be selected at approximately 10 times the frequency of the sounds that are recorded. For example, hand-held sonar return sounds are typically below 3KHz, so the sample rate should be 30 KHz which is the maximum rate for the equipment that was used in the model embodiment. Ten digital samples for each cycle of the sound is sufficient to retain high fidelity and reproducibility.

The purpose of processing the samples is to select and retain prime examples of waveforms that will be used in the interactive scenarios. Selection is made easier by the use of a commercial software program that supports the multisammpler and the microprocessor. The software should present the wavesample visually on the microprocessor's display, and provide a means to tailor and loop the sample. The program that was used in the model embodiment was written for the MIRAGE by Turtle Beach Softworks and is entitled, Vision. It permits the complete wavesample to be displayed, and a portion of the sample to be enlarged. The displayed image can be adjusted and/or tailored to carefully match a selected ending point of a waveform to a selected beginning point, to form a visual loop of the selected sound. The looped wavesample is digital data that translates into a continuous and repetitious audio performance of the selected sound, such as the ping of a sonar or the toll of a bell. The loop is storable by indexing it in multisampler memory, and by copying it onto a microdiskette for removal and use later. It is desirable to have large memory in multisampler 16 in order to accommodate more than one loop for playback. In the model embodiment a one-megabyte memory expansion board from Indian Valley Manufacturing was installed in multisampler 16 for that purpose.

The second interrelated part of the preferred embodiment, is the visual. The visual is the graphics that are presented by processor 10 on its display 14. For purposes of providing a complete disclosure, the source code of Annex A incorporates routines for generating the graphics that were used in the model embodiment. The graphics depict the environment that was described by the diver in the notes he made during the original recording of the sounds. For example, the graphics for depicting underwater use of the hand-held sonar device include a set of concentric circles that symbolize range settings centered about a light spot that denotes the position of the diver and his sonar device, a header that shows the compass heading in text form that indicates the compass direction in which the diver is aiming the sonar at that moment, and one or more predetermined target locations that become visible when the compass heading and the target direction coincide. Of course, other scenarios can be developed that are not direct translations of the diver's notes. However, the scenarios should be made to stimulate an environment and experience that the trainee might encounter. The graphics routines are part of the program that runs in processor 10, as distinguished from the sound loops and their program parameters which run in multisampler 16. As a result, the graphics routines may be prepared in accordance with the same techniques that are used for conventional graphics software designed for a microprocessor. The adequacy of the graphics is determined by their ability to sufficiently demonstrate the environment that corresponds to the sounds that the trainee is learning, for the training session to substitute for experience, at least in part.

The computer program of Annex A is run on microprocessor 10, and is menu driven in accordance with FIG. 2. Shown in FIG. 2 is the structure of the source code that is disclosed in Annex A. MainMenue 110 offers a selection of available training sessions, tutorials and an exiting routine. The training sessions include the demonstration mode, shown in FIG. 2 as NoQuiz menu 112; and, the interactive modes, shown as SynQui2 modules 114, and MisnList menu 116. When, for example, the trainee is selecting from MainMenu 110, he may choose an operation tutorial on the sonar device, an operation tutorial on the training device, the menu for prerecorded single-target scenarios, the menu for synthesized multi-target scenarios, a synthesized multi-target quiz, or a routine to exit the sequence and return to the microprocessor's operating system. If he chooses the demonstration mode for prerecorded single-target scenarios the NoQuiz menu 112 will appear on display 14 and list a plurality of targets from which the trainee may choose, such as metal sphere, submerged log, and MP80 bottom mine, along with textual material that offers instructions or describes the lesson. He is instructed to place the tape for the lesson he selects, in audio tape unit 22. Upon entering his selection on keyboard 12, an introduction and instructions will appear on display 14. For example, if he has selected his target to be a metal sphere, NoQuiz menu 112 will direct him to install the appropriate audio tape in tape unit 22 and press the key on keyboard 12 that corresponds to his selection. The keystroke loads the routine for MetalSph 118 that first provides instructions on display 14 to begin the lesson, and then provides the previously prepared graphics that correspond to the sounds contained on the audio tape for metal sphere. The graphics are shown on display 14, and change in response to the encoded signal that appears on the tape track that is adjacent the sound track. The demonstration may run without interruption and without response from the trainee. Thereafter, the trainee may replay the demonstration, select another demonstration scenario, or choose to take a quiz that involves interaction.

When the trainee desires to test his skill on multiple targets, he selects SynQui2 module 114 of the interactive mode from MainMenu 110. The submenu screen explains how the quiz that he has selected will be conducted and instructs the trainee to load the appropriate microdiskettes into multisampler 16. Predetermined questions, randomly selected, are presented to the trainee who responds by pressing a key on keyboard 12 that corresponds to his selection from a list of multiple choices. In the quiz he may be asked, What is the scale?, which means what was the scale setting on the handheld sonar device when the sound he is hearing was recorded? Other questions include, What is the range?, and, What is the target? At the conclusion of the quiz, the software displays an analysis of the answers by category showing the areas of required improvement.

The MainMenu option for multiple target scenario involves MisnList menu 116. Instructions appear on display 14 to brief the trainee about the scenario. The scene is that he has been dropped in an area likely to have targets, and now he has limited time to do a 360 degree sweep of the area, locate the target(s), and note their compass bearing, range and target type. The MisnList submenu 116 lists a plurality of locations from which the trainee may choose, such as Augusta, Sicily and the Panama Canal. The trainee is informed on display 14 that in some scenarios he may find more than one target and that in others he only may find debris. He is instructed to install the proper mission disk in multisampler 16 for the location he has selected, and to choose a degree of difficulty, either expert or beginner. The beginner is provided twice as much time as the expert to complete the mission. Finally, the trainee is given the option to add background noise for increased difficulty and realism, noise that represents propellor cavitation sounds.

A text is presented on display 14 to prepare the trainee for the mission. Assume for example that Mission 2 was selected. Mission 2 is for Store Baelt, Denmark, under Specific Scenario Module 120, and has a text as shown in Annex A that reads as follows: "While in the strategic naval corridor of Store Baelt in Denmark, a ship foundered in heavy seas and lost a bottom mine from its deck. Since this is one of two access channels for the Soviet Northern Fleet from their bases in the Baltic Sea to the Atlantic Ocean, it is vital that this mine be located before an international incident occurs. You are to be dropped from a helicopter at the location the mine was reported lost and verify its exact location from the drop zone to relay to the recovery team."

The trainee uses the arrow keys on keyboard 12 to rotate right or rotate left throughout 360 degrees. For each sound heard, the trainee determines whether it is the target. If it is, he records the compass bearing and range to the target from the drop point. The trainee is debriefed by asking him whether the mine was in his area, in which direction was the mine, and how far was it from the drop zone. The questions are presented on display 14, and the trainee answers by referring to his notes and making entries on keyboard 12. Feedback is provided on display 14 by showing the results of the mission in each of the categories, target identification, range identification, and location identification.

From the foregoing, it readily may be seen that the present invention comprises a new, unique, and exceedingly useful low-cost sound related training device that constitutes a considerable improvement over the known prior art. Obviously, many modifications and variations of the present invention are possible in light of the above teachings. It is, therefore, to be understood that within the scope of the appended claims, the present invention may be practiced otherwise than as specifically described.

What is claimed is:

1. Apparatus that provides sound related training by using sounds that have been recorded in the environment in which they occur, to school trainees in the direction, identification and interpretation of sounds that in their environment normally do not occur enough to be reliably used for training, or if they do occur enough, the environment in which they occur is not convenient for training, comprising:
   a recording of sequential sounds;
   means for indexing said sounds by digitally recording samples of said sounds in temporary storage;
   means for subsequently detecting selected sounds by their indexes and presenting in response thereto a graphical display that corresponds to the indexes, comprising a programmed processor; and,
   means for providing an audible output of the selected sounds;
   such that the graphical display presented corresponds to the sounds provided.

2. The apparatus of claim 1 wherein said indexing means further comprises means for permanently storing said samples.

3. The apparatus of claim 2 wherein said indexing means comprises an analog-to-digital converting multisampler device having internal temporary digital storage, disk drive and diskette based external permanent digital storage, and a digital-to-analog converting output.

4. The apparatus of claim 3 wherein said indexing means further comprises a dual channel audio tape recorder interfaced to said processor.

5. The apparatus of claim 4 wherein said sequentially recorded sound is on a first track of a stereophonic tape, and indexing is by an encoded signal generated by said processor and recorded on the second track of said stereophonic tape.

6. The apparatus of claim 5 whrein said processor is responsive to programs selectable from more than one mode.

7. The apparatus of claim 6 wherein the modes include a demonstration mode wherein at least one previously programmed scenario of dynamic graphics is presented by said processor in response to said encoded signal on said second track of said tape to correspond with sounds provided by the first track of said tape.

8. The apparatus of claim 7 wherein the modes include an interactive mode using digital storage of preselected sounds in said multi-sampler, and digital storage of previously prepared corresponding graphics in said processor, and wherein said processor further includes an input device to which it responds to control said multi-sampler and said graphics in accordance with said program to vary the sounds and display for interactive simulation.

9. The apparatus of claim 8 wherein said modes are selectable with said input device from a set of menus on the display, including a main menu for selecting a tutorial for operating the apparatus, a tutorial for operating the equipment about which said sequentially recorded sound is associated, a sub-menu for selecting at least one demonstration scenario in which said stereophonic tape is used, and at least one sub-menu for selecting at least one synthesized scenario in which said multi-sampler is used.

* * * * *